United States Patent
Pinto et al.

[11] Patent Number: 6,062,320
[45] Date of Patent: May 16, 2000

[54] PLANTING AND POST HOLE TOOL

[76] Inventors: Juan A. Pinto, 6711 Orion Ave., Van Nuys, Calif. 91406; Sergio Hernandez, 7541 Cartwright Ave., Sun Valley, Calif. 91352

[21] Appl. No.: 09/156,679

[22] Filed: Sep. 18, 1998

[51] Int. Cl.[7] .................................................. A01B 1/00
[52] U.S. Cl. .............................................. 172/381; 294/50.6
[58] Field of Search ................................ 172/371, 378, 172/380, 381; 294/61, 50.6, 51, 49, 50.5, 50.9

[56] References Cited

U.S. PATENT DOCUMENTS

| | | |
|---|---|---|
| 220,251 | 7/1879 | Needham . |
| 570,810 | 11/1896 | Meier . |
| 849,957 | 4/1907 | Zwiebel . |
| 2,021,982 | 11/1935 | Byrne . |
| 3,847,227 | 11/1974 | Myers . |
| 4,950,013 | 8/1990 | Yonkers ..................................... 294/49 |
| 5,209,534 | 5/1993 | Crenshaw et al. . |
| 5,716,132 | 2/1998 | Chou ................................. 172/371 X |

*Primary Examiner*—Robert E. Pezzuto
*Attorney, Agent, or Firm*—Lewis D. Sternfels

[57] ABSTRACT

A single-handle tool (20) for manually forming cylindrically-shaped holes in soil is useful for planting shrubbery or for posting. A uniquely angled and shaped pocket (30) is formed in a shovel (26). The shovel is attached to one end of a shaft (22) while a handle (24) with a knob (28) extends at 90° to the other end of the shaft. Shovel (26) comprises an upper component (32) secured to a lower component (34) at an angle of about 135°. The upper component is formed from a pair of joined portions (36, 38) to form an arched (curved or angled) configuration. This combination of the 135° angle between the upper and lower components and the arched configuration forms pocket (30). In operation, the user swivels the handle to rotate the shaft and pocket such that the unique sharp ended and contoured shovel cuts a cylindrical hole (52) and retains cut soil in the pocket for removal from the hole.

13 Claims, 2 Drawing Sheets

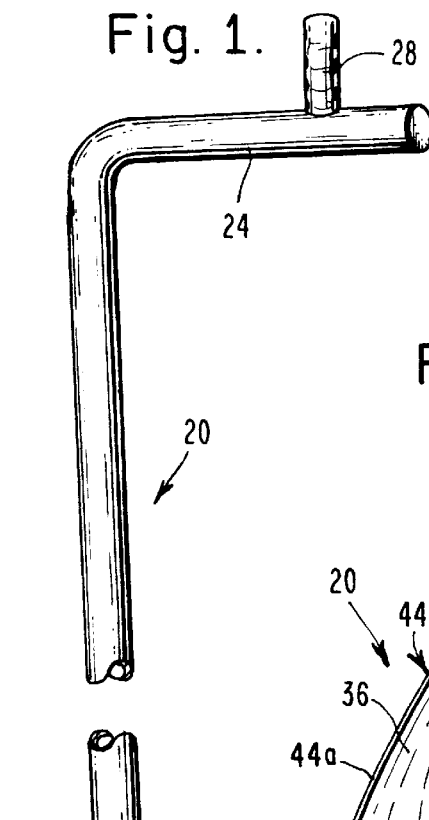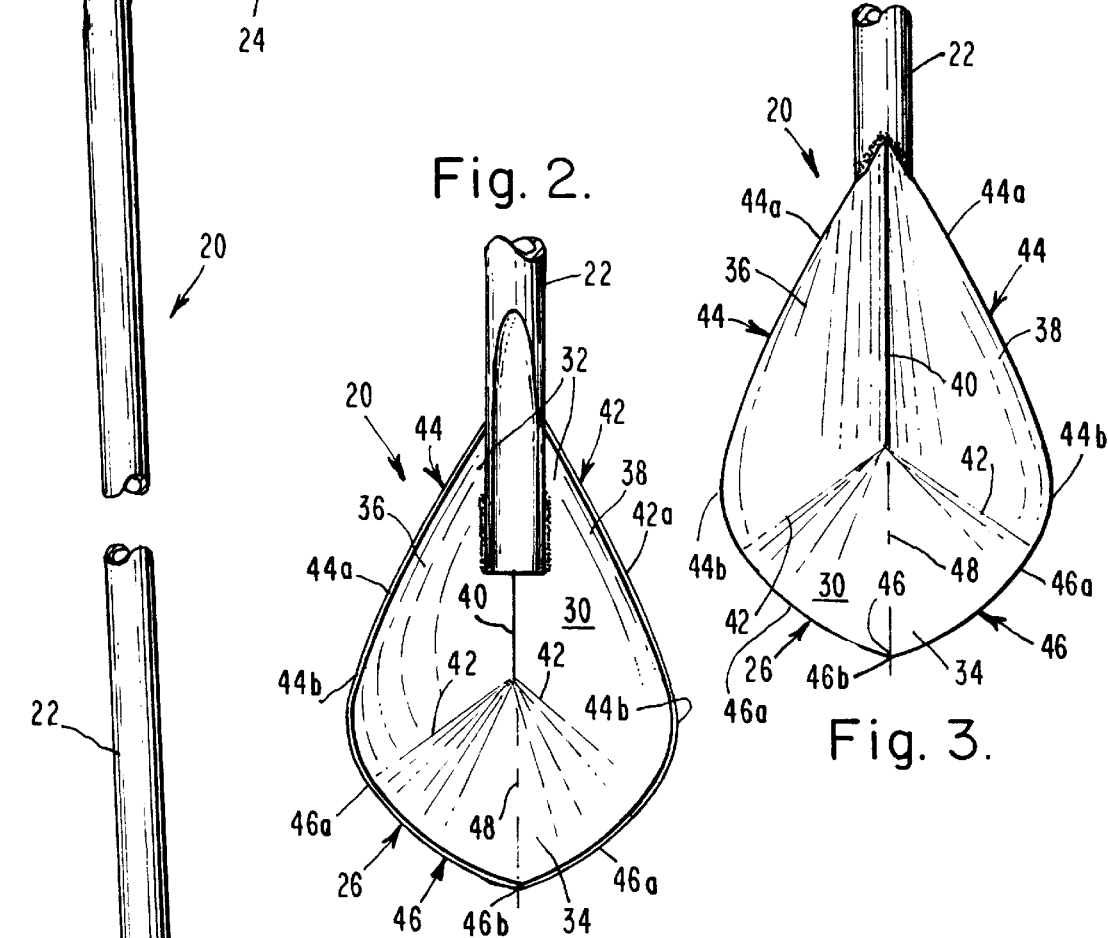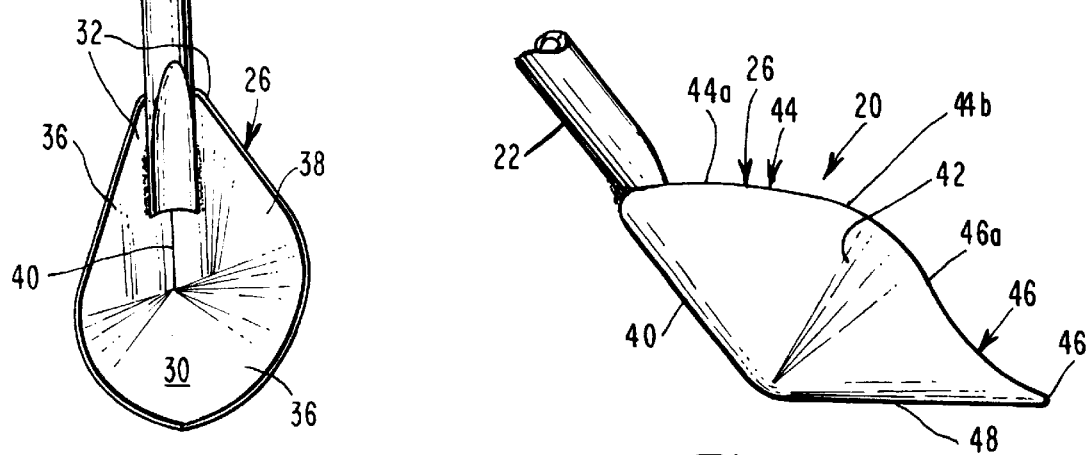

PLANTING AND POST HOLE TOOL

CROSS-REFERENCE TO RELATED APPLICATION

Not Applicable

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

The present invention relates to gardening tools and, in particular, to improvements in planting and post hole tools.

2. Description of Related Art and Other Considerations

It is ofttimes desirable that holes for planting and for posting be generally cylindrical in shape, and many tools have been designed to meet this end. Examples include tools described in patents U.S. Pat. No. 220,251 (Needham), U.S. Pat. No. 570,810 (Meier), U.S. Pat. No. 849,957 (Zwiebel), U.S. Pat. No. 2,021,982 (Byrne), U.S. Pat. No. 3,847,227 (Myers), U.S. Pat. No. 4,950,013 (Yonkers), and U.S. Pat. No. 5,209,534 (Crenshaw et al). Some of the tools described in these patents include means by which soil can be removed from the hole under construction and held within the tool, an additionally desirable feature. Such holding means may be by compressing loosened soil within the tool, e.g., as described in patents U.S. Pat. Nos. 220,251, 849,957 and 2,021,982. A shock or the like against the tool or the employ of the user's foot against the held soil permits its release. U.S. Pat. No. 570,810 describes a scoop having three blades, in which one blade makes the advanced cut and slightly holds the dirt, the second follows with a broader cut and also slightly holds the dirt, and the third does no cutting but retains the soil in the scoop. While all appear to achieve the tasks for which they are devised, they exhibit disadvantages. For example, compressed soil is not always easily retained within the tool, and may require the addition of water to provide adequate binding. The use of a specialized three-part scoop adds complexity and cost to the tool, and each blade is subject to bending and, therefore, degradation in the function of the tool.

SUMMARY OF THE INVENTION

These and other problems are successfully addressed and overcome by the present invention. Briefly, the tool described herein comprises a novel shovel secured to a shaft and handle. The shovel includes two components both of which are symmetrically shaped. The first component is connected to the shaft and has an arched configuration. The arch may be configured as a continuous curve or flat or curved portions secured together to reflect a joint or central line. The second component is so angled to the arched first component as to form, with the arched configuration, a pocket to retain soil. The shaft is rotatable about its axis either clockwise or counterclockwise, because of the symmetrical shape of the shovel, to enable rotation of the first and second components with respect to soil for enabling cutting of the soil and retention of cut soil in the retainer. When a centrally extending line of the continuous curve or joint line of the first component forms an extension of the shaft axis, this coaxial arrangement defines an axis of rotation for the shovel to enhance cylindrical cutting of soil.

Several advantages are derived from this arrangement. The tool is simple and, thus, reduces its cost. It is rugged and, therefore, resistant to damage and wear. The symmetrical configuration of the shovel permits it to be rotated in either direction, either clockwise or counterclockwise.

Other aims and advantages, as well as a more complete understanding of the present invention, will appear from the following explanation of an exemplary embodiment and the accompanying drawings thereof.

BRIEF DESCRIPTION OF THE DRAWINGS

FIG. 1 is a perspective view of the tool, depicting a shovel secured to a shaft and handle;

FIG. 2 is a front elevational view of the shovel end of the tool;

FIG. 3 is a rear elevational view of the shovel end of the tool;

FIG. 4 is a side elevational view of the shovel end of the tool; and

DETAILED DESCRIPTION OF THE PREFERRED EMBODIMENT

Figure 5:
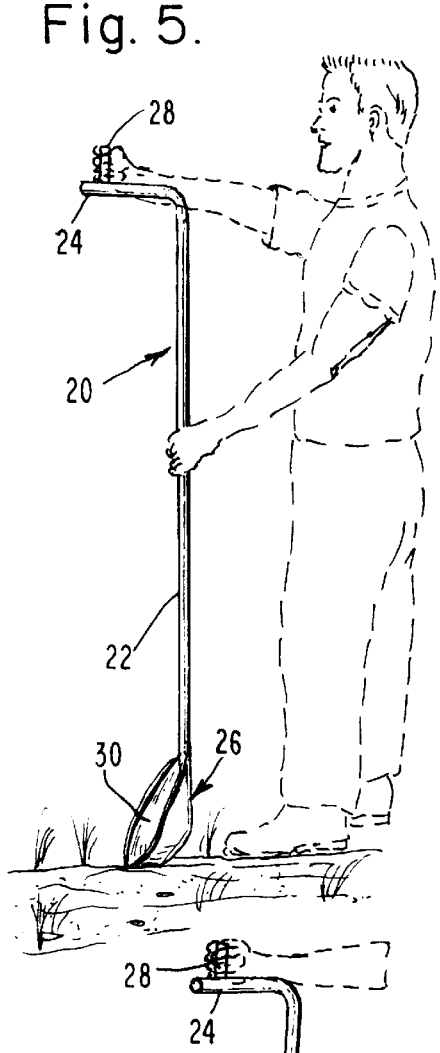
FIGS. 5–8 illustrate use of the tool.
Figure 6:
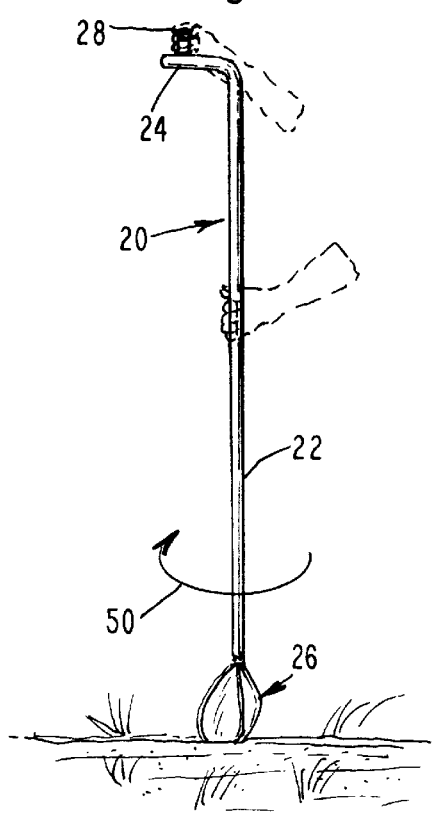

As depicted in FIGS. 1–4, a tool 20 comprises a shaft 22 having at its opposite ends a handle 24 and a spoon-shaped shovel 26. Shovel 26 is secured to shaft 22 in any convenient manner, such as by welding, and may be secured to the inner or outer surface of the shovel. As illustrated, the securing is at the inside of the shovel. Handle 24 extends 90° from the shaft to permit turning of the shaft and the shovel. A knob 28 may be secured in a swivelable manner to handle 24 to facilitate turning of the shaft and, consequently, the shovel.

The contour or configuration of spoon-shaped shovel 26 is a critical and inventive feature of the present invention. It is arched, e.g., curved and/or angled in a generally symmetrical configuration, to define a hole to be cut from the soil as it is turned in either direction, clockwise or counterclockwise, and includes a pocket or soil retainer 30 to contain cut soil as the shovel is turned, so that the soil may be scooped from the hole and deposited exterior thereto.

Specifically, shovel 26 includes a first or upper component 32 and a second or lower or base component 34. Component 32 is shaped into an arched configuration. As an arch, upper component 32 may comprise a continuous curve or a pair of joined together portions 36 and 38. Portions 36 and 38 may each be curved and are joined together at a sharp angle line junction 40. However, should the portions form a continuous curve, line 40 then reflects a generally central line. Portions 36 and 38 join base component 34 at curved junctions 42, although these junctions may be sharply angled. Shaft 22 resides within sharp angle junction or central line 40 and is shown welded to portions 36 and 38. Portions 36 and 38 and base component 34 are configured to provide first component edges 44 and a base component edge 46. First component edges 44 have relatively straight upper segments 44a which extend into curved segments 44b. Base component 46 includes slightly curved segments 46a which extend from curved segments 44b and meet at centrally positioned curved segment 46b. Segment 46b forms the tip of shovel 26.

Base component 34 is curved in order to accommodate the arched configuration of component 32, and may be characterized as having a central or dividing line 48, shown as a section line in FIGS. 2 and 3 and a boundary line in FIG. 4. As such, it extends from juncture or central line 40 dividing upper component portions 36 and 38. As illustrated in the side elevational view depicted in FIG. 4, lines 40 and 48 are angled with respect to one another, generally at 135° to form retainer or pocket 30. However, this 135° angle is not essential; it may range between 90° and 180° and is only limited to the extent of enabling pocket 30 to retain soil.

In addition, shovel 26 may be described as having a tear drop shape, when viewed in front and rear elevation as illustrated in FIGS. 2 and 3.

The lowermost parts of outer edges 44a of portions 36 and 38 and the entire edge of base component 34 are ground to form a knife-like edge configuration to promote cutting into the soil. The uppermost parts of outer edges 44a need not be so ground.

Figure 7:
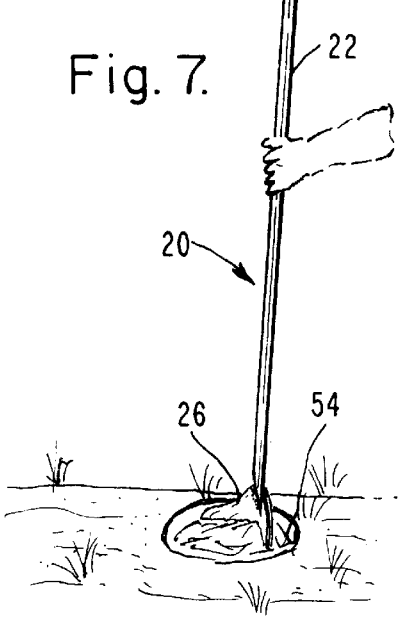
Figure 8:
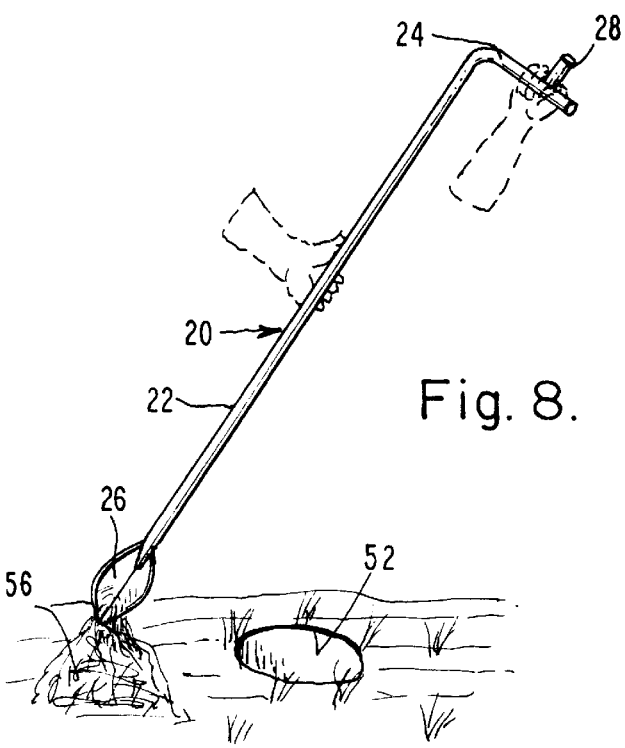

Operation of the invention is depicted in FIGS. 5–8. As shown in FIG. 5, spoon-shaped shovel 26 of tool 20 is placed on the ground where a hole (denoted by indicium 52 in FIG. 8) is to be dug. By placing one hand on shaft 22 and the other on handle 24 or its knob 28, the user turns the tool in the direction denoted by arrow-headed curved line 50, or in the opposite direction, as permitted by the symmetry of the shovel to rotate the shovel from its position shown in FIG. 5 to that shown in FIG. 6 to illustrate how a beginning hole is circumscribed and cut. Continuing rotation of the tool, as depicted in FIG. 7, permits the tool to cut further down in the hole (designated by indicium 54) in formation. Sufficient rotation, which may comprise one or more encirclements of 360°, results in an amount of cut soil to be retained in pocket 30, at which point the user may remove such retained soil from the hole and deposit it exterior and/or adjacent thereto, as illustrated in FIG. 8, into a pile 56. Depending upon the depth of hole desired, this operation may be repeated until the chosen depth is attained.

Although the invention has been described with respect to a particular embodiment thereof, it should be realized that various changes and modifications may be made therein without departing from the spirit and scope of the invention.

What is claimed is:

1. A planting and post hole tool having a shaft extending along an axis and a shovel, the improvement in which:

said shovel includes a first component secured to said shaft and a second component extending from said first component;

said first component has a generally symmetrically-shaped arched configuration and an axis that is coaxial with said shaft axis to define a coaxial axis of rotation for said arched configuration for enabling cutting of soil; and said second component is generally symmetrically configured and is connected to said first component at an angle to form, with the arched configuration of said first component, a generally symmetrically shaped retainer to hold cut soil, said symmetrical configurations permitting the cutting and holding of the soil regardless of whether said shovel is rotated in a clockwise or counterclockwise direction.

2. The improvement according to claim 1 further comprising cutting edges terminating said first and second components for enhancing the cutting of the soil.

3. The improvement according to claim 2 in which said cutting edges extend fully about said second component edges and along segments of said first component edges contiguous with said second component edges.

4. The improvement according to claim 1 in which said first and second components are configured to provide a teardrop shape in front and rear elevational view, and a scoop shape in side elevational view.

5. The improvement according to claim 4 in which said connection between said first and second compartments is defined by a line essentially bisecting said second compartment angled sufficiently with respect to said first compartment to form, with said arched configuration, said retainer.

6. The improvement according to claim 4 in which said connection between said first and second compartments is defined by a line essentially bisecting said second component angled between 90° and 180° from said first component axis to form said retainer.

7. The improvement according to claim 4 in which said connection between said first and second compartments is defined by a line essentially bisecting said second component angled about 135° from said first component axis to form said retainer.

8. The improvement according to claim 1 further comprising a handle secured to said shaft at an end thereof opposite to said first components and angled to said shaft to enable rotation of the shaft and said shovel.

9. The improvement according to claim 8 further comprising a knob rotatably secured to said handle about an axis generally parallel to said shaft axis to aid in the rotation of said shaft and said shovel.

10. A planting and post hole tool having a shaft extending along an axis and a shovel, the improvement in which:

said shovel includes a first component secured to said shaft and a second component extending from said first component;

said first component includes a pair of similarly shaped essentially flat portions secured together at a midpoint to form a symmetrical arched configuration and to define a line axis which is coaxial with said shaft axis, and together which define a coaxial axis about which said portions can be rotated for enabling cutting of soil;

said second component has an connection to said first component which is angled thereto, and is generally symmetrically curved to enable said connection to form, with the arched configuration of said first component, a generally symmetrically shaped retainer of sufficient dimension to hold cut soil; and a handle secured at an angle to said shaft at its end opposite from where said shovel is secured thereto and a knob secured at an angle to said handle, for assisting rotation of said shovel in a clockwise and a counter-clockwise direction.

11. A planting and post hole tool having a shaft extending along an axis and a shovel, the improvement in which:

said shovel includes a first component secured to said shaft and a second component extending from said first component;

said first component is shaped to provide a generally symmetrically shaped arched configuration and is provided with an axis that is coaxial with said shaft axis to define a coaxial axis of rotation for said arched configuration for enabling cutting of soil; and said second component is generally symmetrically shaped and has a connection to said first component which is angled thereto to form, with the arched configuration of said first component, a generally symmetrically shaped retainer to hold cut soil.

12. A planting and post hole tool having a shaft and a shovel, the improvement in which:

said shovel includes a first component secured to said shaft and a second component extending from said first component;

said first component is shaped to provide a generally symmetrically shaped arched configuration and has an axis of rotation for enabling cutting of soil; and said second component is generally symmetrically shaped and is connected to said first component at an angle thereto to form, with the arched configuration of said first component, a generally symmetrically shaped retainer to hold cut soil.

13. A planting and post hole tool having a shaft and a shovel, the improvement in which:

said shovel includes a first component secured to said shaft and a second component extending from said first component;

said first component includes a pair of generally symmetrically shaped essentially flat portions secured together at a midpoint to form an arched configuration and to define a line axis about which said portions can rotate in either direction for enabling cutting of soil; and said second component is connected to said first component at an angle thereto, and is generally symmetrically curved to enable said connection to form, with the arched configuration of said first component, a symmetrical configured retainer of sufficient dimension to hold cut soil even when said shaft and said shovel are held substantially vertical with respect to the soil.

\* \* \* \* \*